(12) United States Patent
Waldner

(10) Patent No.: US 7,377,473 B2
(45) Date of Patent: May 27, 2008

(54) DECORATIVE LAWN ORNAMENT FOR SUPPORTING A WEATHER DEVICE

(75) Inventor: David Waldner, Ste. Agathe (CA)

(73) Assignee: Crystal Spring Colony Farms Ltd., Ste. Agathe, Manitoba (CA)

( * ) Notice: Subject to any disclaimer, the term of this patent is extended or adjusted under 35 U.S.C. 154(b) by 281 days.

(21) Appl. No.: 11/401,455

(22) Filed: Apr. 11, 2006

(65) Prior Publication Data

US 2006/0248828 A1    Nov. 9, 2006

(51) Int. Cl.
*A47G 23/02*    (2006.01)

(52) U.S. Cl. ...................................... 248/146; 248/156

(58) Field of Classification Search ................ 248/127, 248/146, 156, 158, 176.1, 545; 40/645, 124.5
See application file for complete search history.

(56) References Cited

U.S. PATENT DOCUMENTS

| | | | | |
|---|---|---|---|---|
| 1,926,468 A | * | 9/1933 | Vogelpohl | 40/124.5 |
| 2,861,764 A | * | 11/1958 | Fisher | 248/146 |
| 3,057,093 A | * | 10/1962 | Gallo | 40/645 |
| 4,359,786 A | * | 11/1982 | Rosberg et al. | 4/144.1 |
| 5,113,627 A | * | 5/1992 | Jarrett, Sr. | 52/157 |
| 5,181,335 A | * | 1/1993 | Todd | 40/606.13 |
| 6,178,651 B1 | * | 1/2001 | Yancey | 33/405 |
| 6,575,417 B1 | * | 6/2003 | Krommenakker | 248/311.2 |
| 7,032,811 B1 | * | 4/2006 | Paulic et al. | 232/39 |

* cited by examiner

*Primary Examiner*—Ramon O Ramirez
(74) *Attorney, Agent, or Firm*—Adrian D. Battison; Michael R. Williams; Ryan W. Dupuis

(57) ABSTRACT

A decorative lawn ornament for supporting an object, such as a rain gauge, comprises an assembly featuring a decorative member, a support device and a support mechanism. The decorative member comprises a metal plate shaped to have visual appeal having a hole therein for mounting on the support device. The support device features a receiving portion for supporting the object, a mounting portion for detachably engaging the plate and a reinforcing portion for supporting said receiving portion on said mounting portion. The mounting portion features a groove in the top surface of a protruding member which extends from one side of the plate to the other through the hole. To mount the plate on the support device, the top edge of the hole in the plate fits within the groove and the bottom edge of the hole slides over the bottom surface of the protruding member and snaps into place. The support mechanism comprises a rod removably engaged to a hole in the bottom of the protruding member, such that the rod can be driven into the ground to support the assembly.

12 Claims, 5 Drawing Sheets

DECORATIVE LAWN ORNAMENT FOR SUPPORTING A WEATHER DEVICE

The present invention relates to a decorative lawn ornament for supporting an object, such as a rain guage.

BACKGROUND

In lawn and garden care, both decorative ornaments and weather devices, such as rain gauges, are often used. Efforts have been made to combine the functional and decorative nature of these two classes of objects. Decorative rain gauges which often feature nature-oriented statuettes are an example of such a combination. The resulting products, while both useful and visually appealing, lack adaptability and versatility as their method of display is limited to resting on a horizontal surface and their appearance is limited by the permanency of their decorative aspect.

SUMMARY

According to one aspect of the present invention there is provided a decorative assembly for supporting an object comprising:

a decorative member comprising a metal plate having a hole therein, said hole having upper and lower edges;

a moulded plastic support device for supporting the object and the decorative member, the support device comprising:

a receiving portion on a first side of the metal plate comprising:

a receptacle for supporting the object; and walls extending upward from the receptacle to receive and position the object;

and a mounting portion comprising:

a main member extending downward from the receptacle of the receiving portion on the first side of the plate;

a protruding member having an upper surface and a lower surface, said protruding member extending from the main member through the hole in the plate to a second side of the plate opposite the first side;

a groove in the upper surface of the protruding member for receiving and positioning the upper edge of the hole through the metal plate; and a hole in the bottom surface of the vertical member; and a support rod for removably engaging the hole in the vertical member of the support device and supporting said device thereon;

arranged such that the upper and lower edges of the hole in the metal plate are removably engaged with the groove and bottom surface respectively of the mounting portion of the support device.

Preferably the support device further comprises a reinforcing portion for supporting the receiving portion on the mounting portion.

Preferably the reinforcing portion comprises a support member supported centrally on the main member of the mounting portion, extending perpendicular thereto and spanning the height thereof such that said support member extends across the receptacle, thereby supporting the receiving portion.

Preferably each wall of the receiving portion is curved such that a cylindrical object can be received and positioned by said walls.

Preferably an upper end of the support rod and the hole in the mounting portion are threaded such that they can be detachably engaged.

Preferably the support rod comprises a mounting mechanism supported on a lower end of the support rod.

There may be provided a base member having a mounting member extending upward for engagement to the mounting mechanism.

In this instance, preferably the mounting member comprises a threaded member.

Preferably the mounting, mechanism comprises a threaded cylinder.

Preferably the lower end of the support rod is threaded such that the threaded cylinder can be detachably engaged to said support road.

Preferably the decorative member comprises mounting means for supporting the assembly on a vertical surface.

Preferably the mounting means comprise at least one mounting hole through the plate such that a fastener can be passed through said mounting hole to the vertical surface.

The present invention provides different ways to support the decorative assembly depending on the desired location. In a first embodiment a support rod connected to the support device be driven into the ground or the decorative member can be fastened to a vertical surface with nails or screws installed through holes included for such a purpose in the latter case, the support rod can be removed from the support device and stored for future use. In a second embodiment, a base member is provided for supporting the assembly by the support rod above the ground on any horizontal surface.

The detachable engagement of the decorative member and the support device makes it easy to change the appearance of the decorative assembly. A variety of decorative members, each featuring the same hole for engagement with the support device, would be interchangeable. In addition, should a situation arise where either the decorative or functional aspect of the device is no longer desired, the respective component of the assembly can be removed. For example, in a decorative assembly for supporting a rain gauge, removal of the decorative member results in a purely functional rain gauge. In the same assembly, removal of the rain gauge results in a purely decorative yard ornament.

BRIEF DESCRIPTION OF THE DRAWINGS

In the accompanying drawings, which illustrate exemplary embodiments of the present invention.

DETAILED DESCRIPTION

Figure 1:
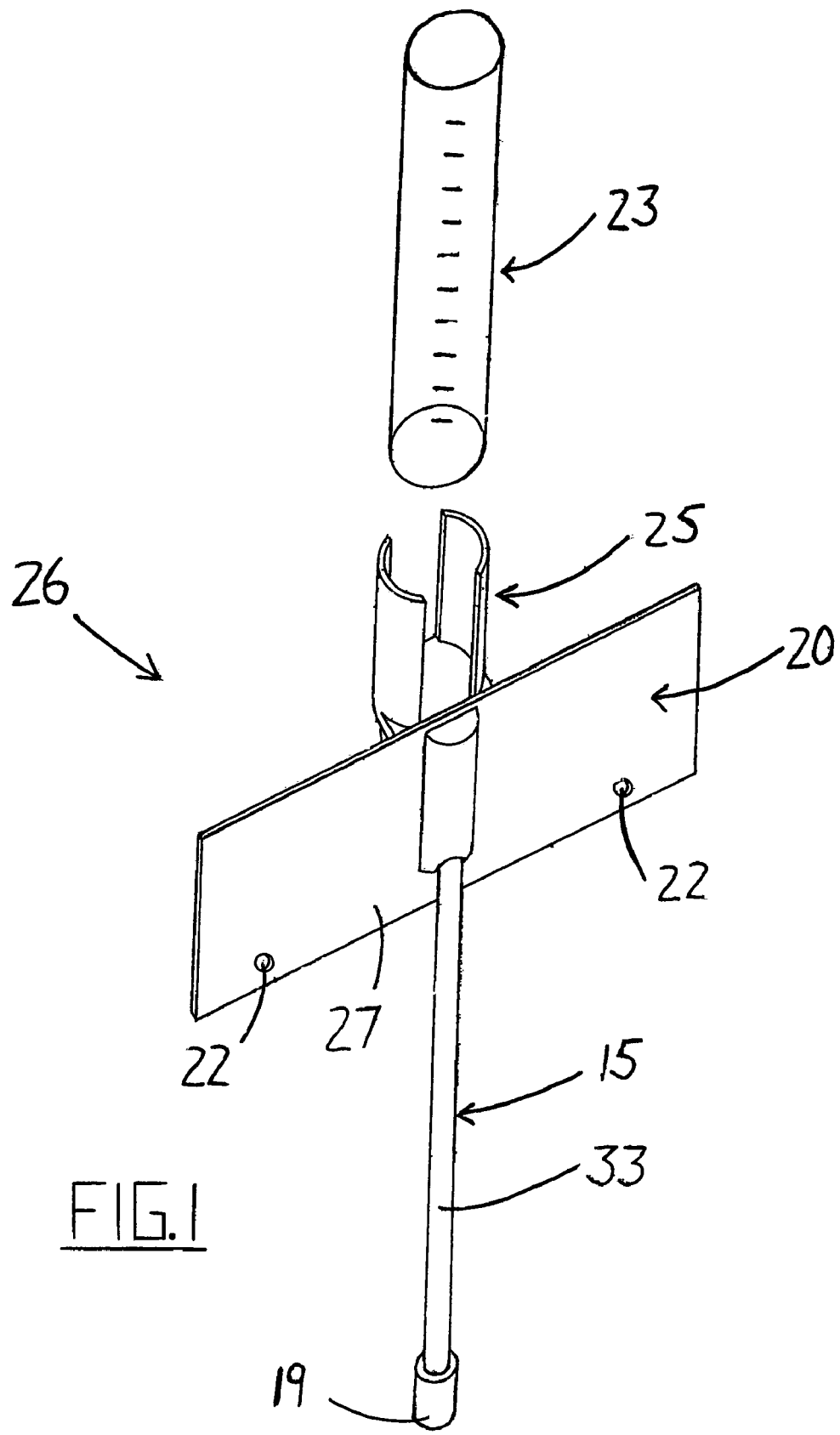
FIG. 1 is an isometric view of a first embodiment of the present invention shown in an assembled state for supporting a rain gauge.
Figure 2:
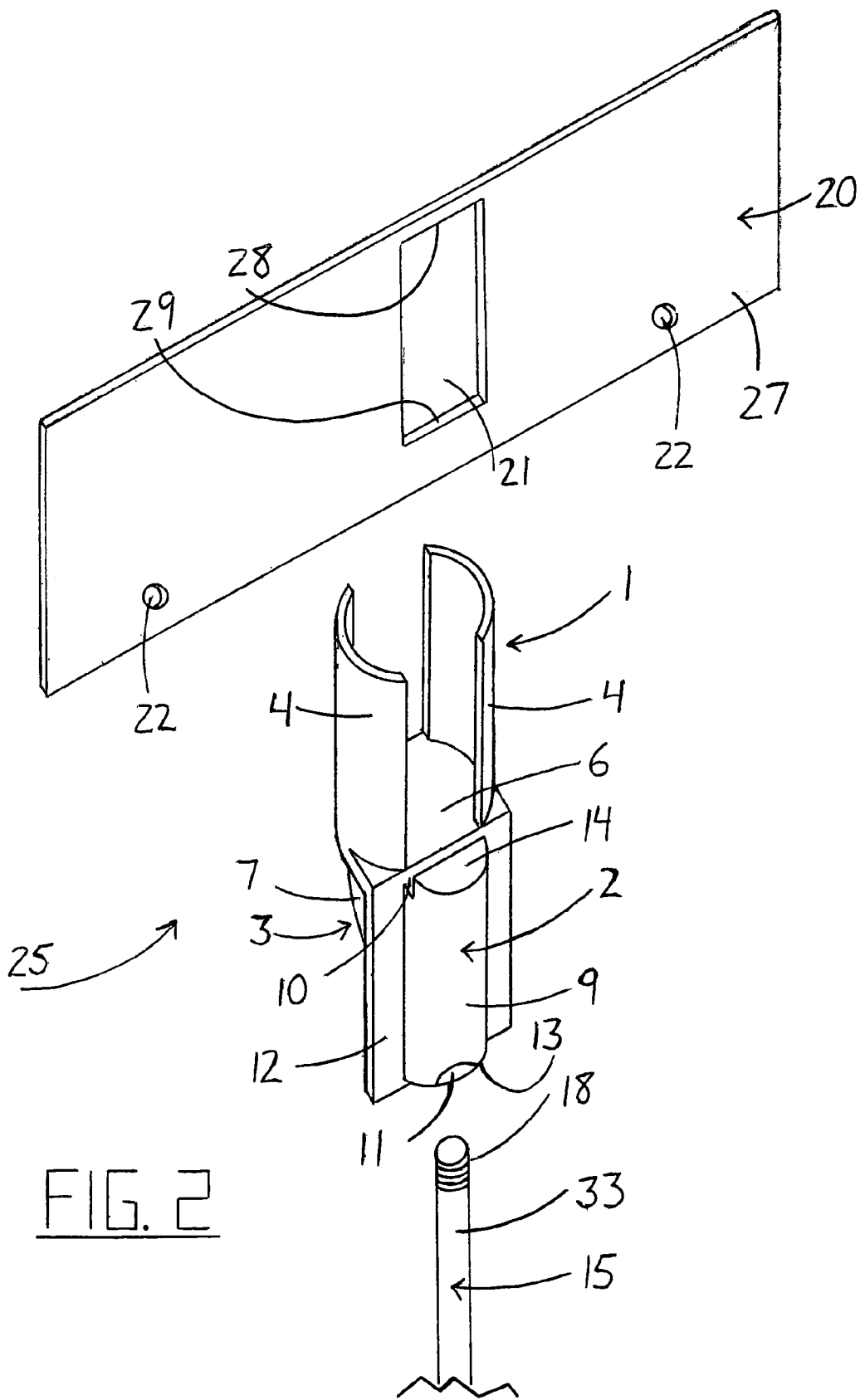
FIG. 2 is an isometric view of the first embodiment of the present invention shown in an unassembled state.
Figure 4:
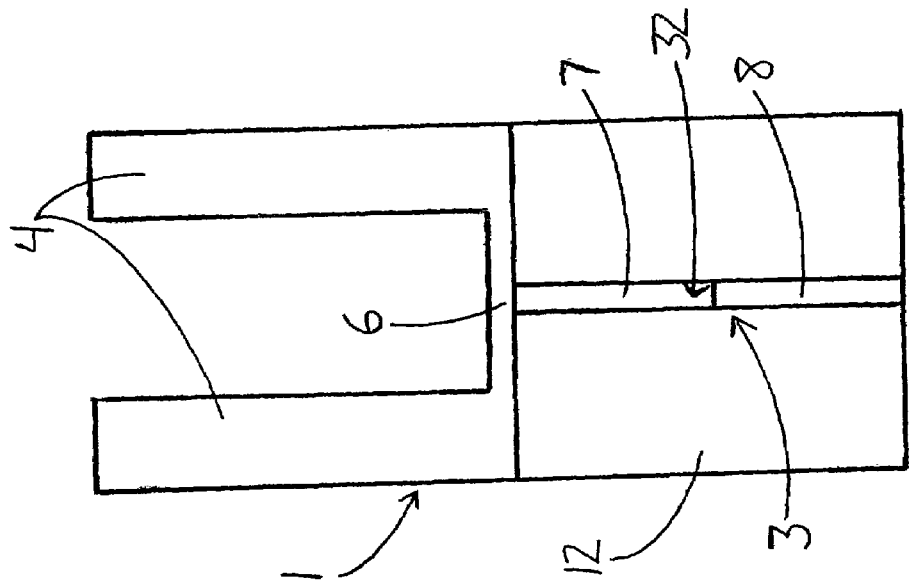
FIG. 4 is a front view of the support device of the present invention.
Figure 3:
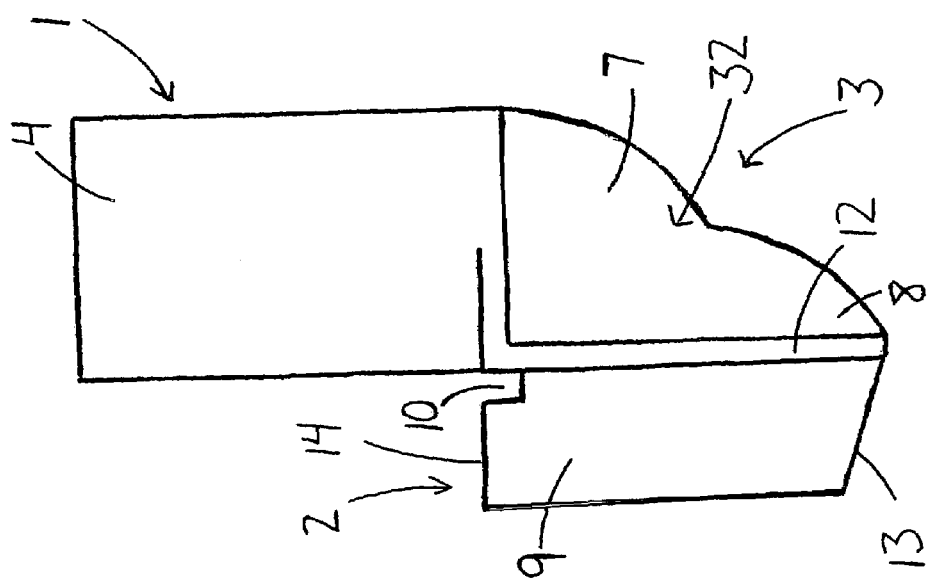
FIG. 3 is a side view of the support device of the present invention.
Figure 6:
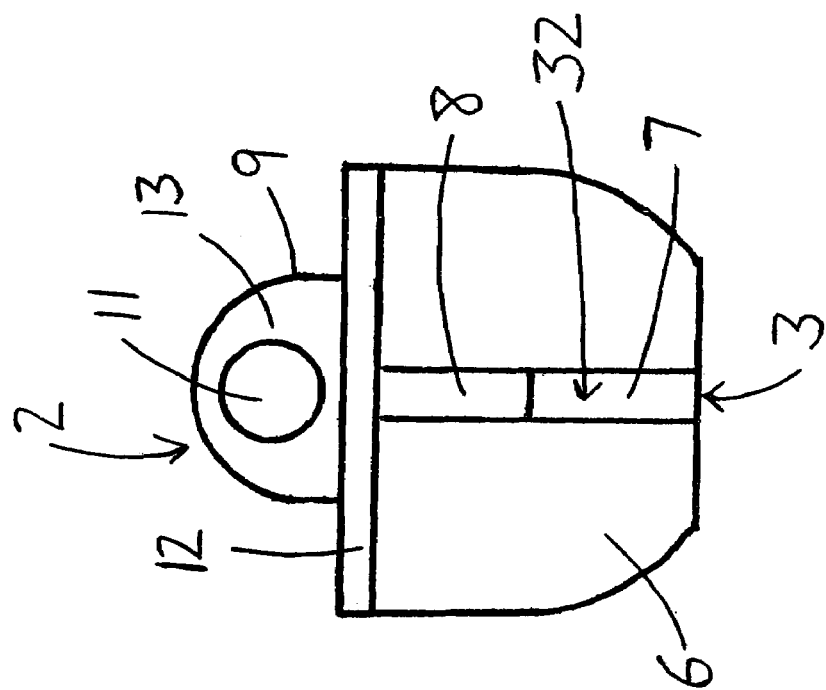
FIG. 6 is a bottom view of the support device of the present invention.
Figure 5:
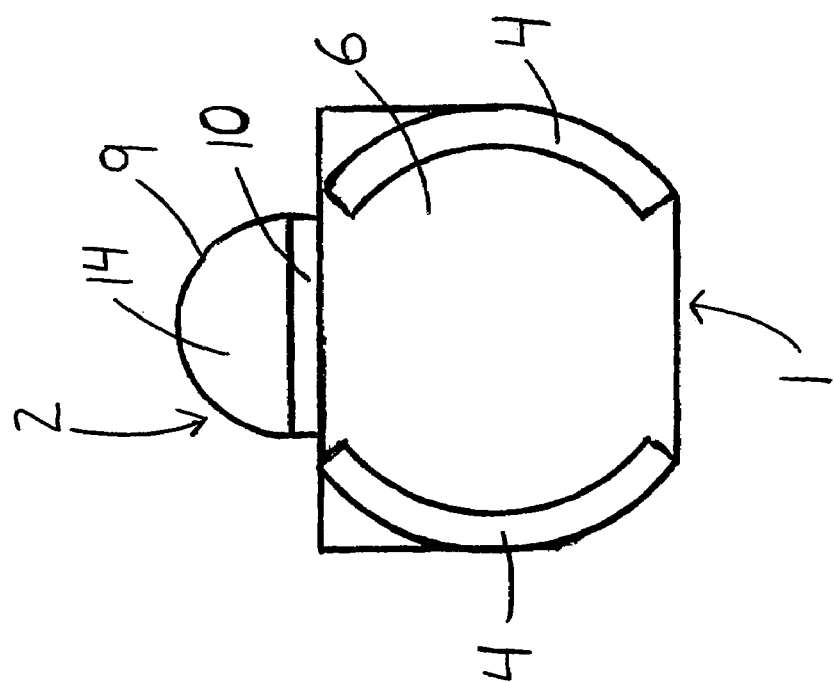
FIG. 5 is a top view of the support device of the present invention.

The present invention, shown assembled and generally indicated by 26 in FIG. 1, is intended for decoratively supporting an object, such as a rain gauge 23, in a lawn or garden. The decorative assembly, shown unassembled in FIG. 2, is made up of three main components. A support device 25 and decorative member 20 are detachably connected to one another and supported on a support mechanism 15.

The decorative member 20 comprises a metal plate 27 having a hole 21 therein for engagement with the support device 25. Mounting holes 22 are included in order to add the option of hanging the decorative member 20 on a vertical surface by means of appropriate fasteners, such as screws or nails. While shown as a rectangular plate in the drawings, the purpose of the decorative member 20 is to add visual appeal to the rain gauge support, and therefore is cut, painted, coated or otherwise processed to form an ornamental piece. Laser cutting can be used to create the rectangular hole 21 and circular holes 22 as well as cut the decorative member 20 into an attractive shape. For example, the plate can be cut to form a silhouette of a nature scene, painted to add color and then protectively coated for the prevention of wear by the elements.

The support device 25, illustrated without the other components in FIGS. 3 to 6, is the most important component of the assembly 26, as it detachably supports both the rain gauge 23 and the decorative member 20. The support device comprises a receiving section 1, a mounting portion 2 and a reinforcing portion 3.

The receiving portion 1 is intended for receiving and supporting the rain gauge 23. A receptacle 6 is provided for the rain gauge 23 to rest on. On either side of the receptacle 6, near or at the edge, is an upward extending wall 4. The walls 4 are curved In order to receive and position the cylindrical rain gauge 23 between them.

The mounting portion 2 of the support device 25 features a main member 12 extending vertically downward from the receptacle 6 of the receiving portion 1 and a protruding member 9 spanning the height of the of the main member 12. The protruding member 9 has a lower surface 13 and an upper surface 14. A groove 10 of rectangular cross section in the upper surface 14 extends across the protruding member 9 along the width of the main member 12. The groove 10 is of such a width that the thickness of the decorative member 20 will fit therein. The portion of the upper surface 14 of the protruding member 9 on the side of the groove 10 opposite the main member 12 is flat and generally semicircular in shape. The combination of this semicircular portion of the upper surface 14 and rectangle formed by the length and width of the groove 10 constitutes the cross sectional shape of the protruding member 9. The upper surface 14 of the vertical member 9 lies in a horizontal plane while the lower surface 13 is inclined upward from the bottom of the main member 12, as best seen in the side view shown in FIG. 3. The slope of the inclined lower surface 13 corresponds to the fact that the vertical distance from the upper surface 14 to the lower surface 13 along the side of the protruding member 9 opposite the main member 12 is the same as the vertical distance from the bottom of the rectangular groove 10 to the lower surface 13 along the main member 12. This distance corresponds to the height of the rectangular hole 21 in the decorative member 20 shown in FIG. 2. This arrangement creates a way to detachably mount the decorative member 20 on the mounting portion 2 of the support device 25. The upper edge 28 of the hole 21 in the decorative member 20 is placed within the rectangular groove 10 in the upper surface 14 of the protruding member 9. The lower edge 29 of the hole 21 is then pulled toward the main member 12 of the mounting portion 2 over the lower surface 13 of the protruding member 9. Since the height of the protruding member 9 along the main member 12 corresponds to the height of the hole 21, the decorative member 20 snaps into place against said main member 12. The decorative member 20 and support device 25 can be seen in their assembled state in FIG. 1.

In addition to providing a way to attach the decorative member and support device to each other, the mounting portion 2 also provides a means of supporting the entire decorative assembly 26 on the support mechanism 15. A hole 11 in the bottom surface 13 of the protruding member 9 is threaded to engage a corresponding threaded upper end 18 of a support rod 33. A threaded cylinder 19 is attached to the rod 33 by means of a threaded lower end similar to threaded upper end 18. The decorative assembly can be removably installed in a yard or garden by driving the support rod 33 into the ground, with or without the threaded cylinder 19 attached, such that the earth surrounding the rod will prevent the assembly 26 from tipping over. The invention can be easily moved to a new location by withdrawing the rod 33 from the ground and moving the assembly 26 to any area where ground conditions will allow reinsertion of the rod. The support device 25 and decorative member 20 can also be installed without the support rod 33 by using suitable fasteners to engage the decorative member 20 to a vertical surface through the mounting holes 22. When installed, the support rod also acts as a locking mechanism that helps ensure that the decorative member 20 remains snapped in place on the mounting portion 2 of the support device 25, as the decorative member is housed between the rod 33 and the main member 12 of the mounting portion.

The reinforcing portion 3 of the supporting device is included to help support the receiving portion 1 on the mounting portion 2. A support member 32 comprises an upper segment 7 and a lower segment 8. The support member 32 extends centrally from the main member 12 of the mounting portion at a right angle and attaches to the lower surface of the receptacle 6, thereby helping support the receiving portion 1 on said mounting portion 2. Each of segments 7 and 8 is curved on the side opposite the main member 12.

Figure 7:
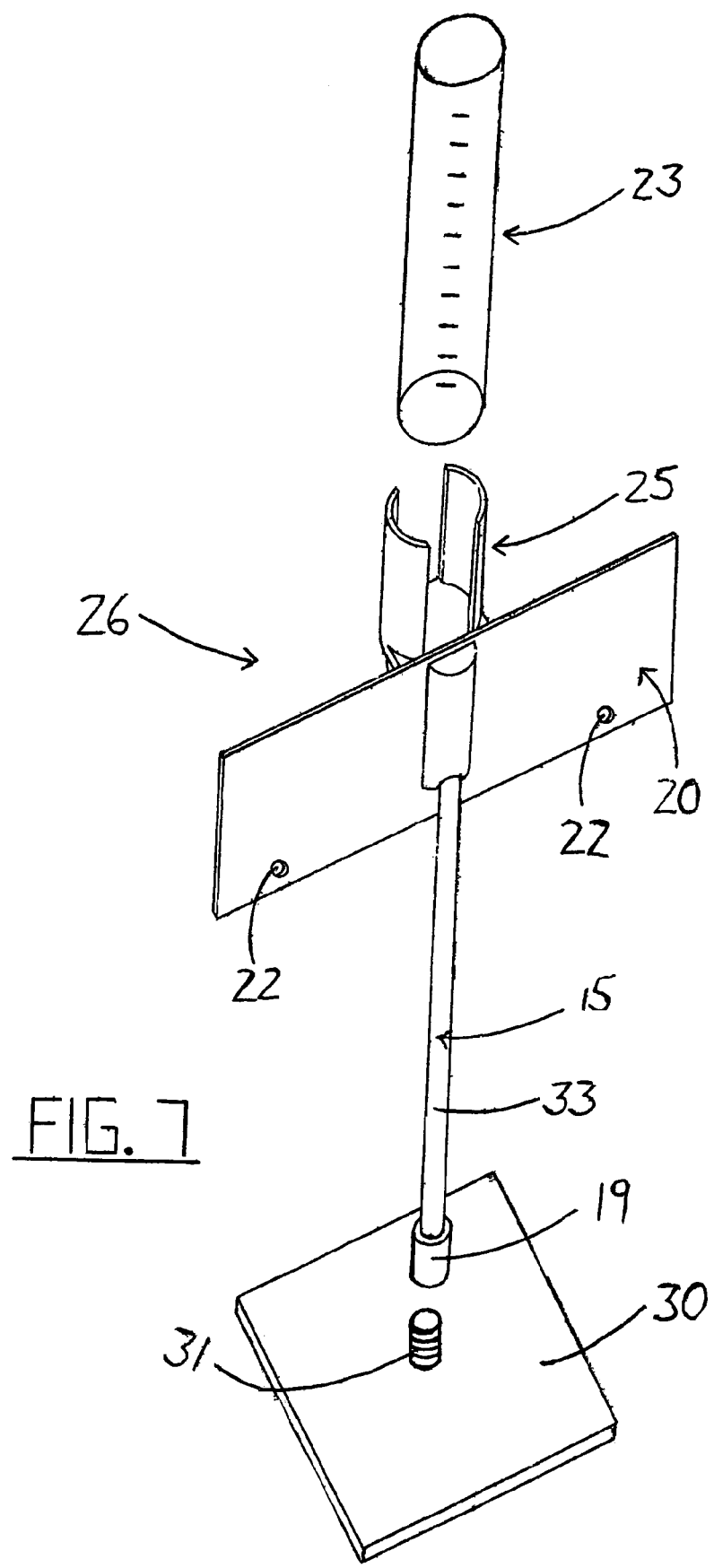
FIG. 7 is an isometric view of a second embodiment of the present invention in which a base member is provided for supporting the other components.

A second embodiment of the invention, illustrated in FIG. 7, provides added flexibility by providing a means of supporting the decorative assembly 26 in cases where the support rod 33 cannot be driven into the ground and the decorative member 20 cannot be fastened to a vertical surface. A base member 30 is provided for placement on a horizontal surface. A threaded vertical post 31 is centrally attached to the base member 30 and extends upward therefrom for engagement with the threaded cylinder 19 on the rod 33. With the base member 30 and support mechanism 15 attached, the decorative assembly 26 is supported entirely above the ground. Positioning of this embodiment of the present invention is not restricted by the requirements of soft ground or a vertical surface, allowing the assembly 26 to be installed in a wider variety of locations.

The versatility of the present invention is illustrated by its ability to serve a purely functional purpose by supporting only the rain gauge 23, to serve a purely ornamental purpose by supporting only the decorative member 20 or to serve both purposes by simultaneously supporting the gauge 23 and the decorative member 20. The invention is also adaptable to its environment as illustrated by its ability to be supported on a vertical surface, in the ground or on any hard horizontal surface.

While the embodiments described have been arranged for supporting a cylindrical rain gauge, the invention can be easily modified to support different weather devices or other objects. Such modifications are well known to those of skill in the art.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A decorative assembly for supporting an object comprising:
   a decorative member comprising a metal plate having a hole therein, said hole having upper and lower edges;
   a moulded plastic support device for supporting the object and the decorative member, the support device comprising:
      a receiving portion on a first side of the metal plate comprising:
         a receptacle for supporting the object; and
         walls extending upward from the receptacle to receive and position the object;
      and
      a mounting portion comprising:
         a main member extending downward from the receptacle of the receiving portion on the first side of the plate;
         a protruding member having an upper surface and a lower surface, said protruding member extending from the main member through the hole in the plate to a second side of the plate opposite the first side;
         a groove in the upper surface of the protruding member for receiving and positioning the upper edge of the hole through the metal plate; and
         a hole in the lower surface of the protruding member;
      and
      a support rod for removably engaging the hole in the protruding member; and of the support device and supporting said device thereon; arranged such that the upper and lower edges of the hole in the metal plate are removably engaged with the groove and lower surface respectively of the mounting portion of the support device.

2. The assembly according to claim 1 wherein the support device further comprises a reinforcing portion for supporting the receiving portion on the mounting portion.

3. The assembly according to claim 2 wherein the reinforcing portion comprises a support member supported centrally on the main member of the mounting portion, extending perpendicular thereto and spanning the height thereof such that said support member extends across the receptacle, thereby supporting the receiving portion.

4. The assembly according to claim 1 wherein each wall of the receiving portion is curved such that a cylindrical object can be received and positioned by said walls.

5. The assembly according to claim 1 wherein an upper end of the support rod and the hole in the mounting portion are threaded such that they can be detachably engaged.

6. The assembly according to claim 1 wherein the support rod comprises a mounting mechanism supported on a lower end of the support rod.

7. The assembly according to claim 6 wherein there is provided a base member having a mounting member extending upward for engagement to the mounting mechanism.

8. The assembly according to claim 7 wherein the mounting member comprises a threaded member.

9. The assembly according to claim 6 wherein the mounting member comprises a threaded cylinder.

10. The assembly according to claim 9 wherein the lower end of the support rod is threaded such that the threaded cylinder can be detachably engaged to said support rod.

11. The assembly according to claim 1 wherein the decorative member comprises a mounting member for supporting the assembly on a vertical surface.

12. The assembly according to claim 11 wherein the mounting member comprise at least one mounting hole through the plate such that a fastener can be passed through said mounting hole to the vertical surface.

* * * * *